US012231503B2

(12) United States Patent
Schmidli et al.

(10) Patent No.: US 12,231,503 B2
(45) Date of Patent: *Feb. 18, 2025

(54) METHOD AND APPARATUS FOR PROCESSING DATA

(71) Applicant: KING.COM LIMITED, St. Julians (MT)

(72) Inventors: Christian Schmidli, Stockholm (SE); Daniel Sundberg, Stockholm (SE); Michael Sjoberg, Stockholm (SE)

(73) Assignee: KING.COM LIMITED, St. Julian's (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,090

(22) Filed: Nov. 14, 2022

(65) Prior Publication Data

US 2023/0073381 A1 Mar. 9, 2023

Related U.S. Application Data

(63) Continuation of application No. 16/117,576, filed on Aug. 30, 2018, now Pat. No. 11,582,307.

(60) Provisional application No. 62/551,992, filed on Aug. 30, 2017.

(51) Int. Cl.
| | |
|---|---|
| *H04L 67/125* | (2022.01) |
| *G06F 9/54* | (2006.01) |
| *G06F 16/2455* | (2019.01) |
| *G06F 16/27* | (2019.01) |
| *H04L 67/00* | (2022.01) |
| *G06N 20/00* | (2019.01) |
| *H04L 67/55* | (2022.01) |

(52) U.S. Cl.
CPC ............ *H04L 67/125* (2013.01); *G06F 9/542* (2013.01); *G06F 16/24568* (2019.01); *G06F 16/27* (2019.01); *H04L 67/34* (2013.01); *G06N 20/00* (2019.01); *H04L 67/55* (2022.05)

(58) Field of Classification Search
CPC ....... H04L 67/125; H04L 67/34; H04L 67/55; G06F 9/542; G06F 16/24568
USPC ........................................................ 709/217
See application file for complete search history.

(56) References Cited

U.S. PATENT DOCUMENTS

| | | | |
|---|---|---|---|
| 10,926,183 B2 | 2/2021 | Covington et al. | |
| 10,949,325 B1* | 3/2021 | Culibrk | ............... G06F 11/3612 |
| 2003/0073495 A1 | 4/2003 | D et al. | |
| 2009/0186700 A1 | 7/2009 | Konkle | |
| 2009/0203449 A1 | 8/2009 | Douceur et al. | |
| 2013/0227596 A1 | 8/2013 | Pettis et al. | |
| 2014/0207840 A1 | 7/2014 | Smith et al. | |
| 2014/0213372 A1 | 7/2014 | Liang | |
| 2014/0351818 A1 | 11/2014 | Katz et al. | |
| 2015/0222730 A1 | 8/2015 | Gower et al. | |
| 2017/0106283 A1* | 4/2017 | Malyuk | .................. A63F 13/49 |

(Continued)

FOREIGN PATENT DOCUMENTS

EP 2819015 A1 * 12/2014 .......... G06F 11/1464

*Primary Examiner* — Meng Vang
(74) *Attorney, Agent, or Firm* — Holzer Patel Drennan

(57) ABSTRACT

A user device has a plurality of modules which support an application such as gaming application. The user device has a stream processing module which is able to stream process events which are generated, for example when the application is run. The events which are generated by the modules are passed to an event module which distributes the events to other of the modules.

20 Claims, 5 Drawing Sheets

(56) References Cited

U.S. PATENT DOCUMENTS

2017/0353537 A1* 12/2017 Crabtree ............ G06Q 30/0202
2018/0081893 A1* 3/2018 Juneja ............... G06F 16/90324

* cited by examiner

METHOD AND APPARATUS FOR PROCESSING DATA

CROSS-REFERENCE TO RELATED APPLICATIONS

This application is a continuation of U.S. application Ser. No. 16/117,576, filed on Aug. 30, 2018, which is based on, and claims priority to U.S. Provisional Application No. 62/551,992, filed on Aug. 30, 2017, the entire contents of both being fully incorporated herein by reference.

FIELD OF THE INVENTION

The present disclosure relates to a method and apparatus for processing data.

BACKGROUND OF THE INVENTION

A number of organizations are continuously collecting large quantities of data which can then be analyzed. The analysis may involve real-time analytics and/or may involve analysis of historical data. The data which is being collected may evolve over time. The data is often collected and sent to a server. The data may be processed in order for example to optimize a user experience based on the data collected from a number of users.

Typically this data is collected from a large number of users. One technical challenge is to ensure that the user device is able to operate in a way in which the user experience is tailored to the user.

Another technical challenge is to improve latency. In the known systems, data is sent from a user device to a server. The server may then provide a response to the user device. This round trip introduces a delay. It is a technical challenge to reduce this delay.

Another technical challenge is to reduce the quantity of data which is sent to the server.

Applications are typically provided on user devices. The applications may provide a computer implemented game or other application. Typically these applications are updated by releasing updates to the application. The updates are provided from a server. However, these updates tend to be provided relatively in frequently. Another technical challenge is to be able to provide more immediate updates to the applications.

SUMMARY OF THE INVENTION

According to an aspect, there is provided a user device comprising at least one processor and at least one memory, said at least one processor and at least one memory providing a plurality of modules supporting an application, said modules comprising: a stream processing module; an event module; at least one further module, wherein at least one of the at least one further modules is configured to generate one or more events and provide said one or more events to said event module, said event module is configured to provide one of more of said one or more events to said stream processing module, said stream processing module being configured to perform stream processing on the provided one or more events to provide an output to said event module.

The event module may be configured to provide the output from the stream processing module to one or more other modules of said plurality of modules. This output may control said application or be provided for use in running the application or be used by the application.

The event module may be configured to provide the output from the stream processing module to an analytics module of said at least one further module.

The stream processing module may be configured to determine dynamically which of said one or more events is to be processed.

The stream processing module may be configured to aggregate a plurality of events over a window to provide an aggregated output, said stream processing module being configured to cause said aggregated output to be transmitted to a server.

The stream processing module may be configured to cause a funnel to be provided on said client and cause a result of said funnel to be transmitted to a server.

The stream processing module may be configured to determine that a series of events have occurred in a given order and in response thereto provide an output.

The output may be transmitted to the server.

The stream processing module may be configured to run one or more scripts and to be updated by one or more scripts received from a server.

At least one module of said at least one further module may be configured to provide at least one event which can only be used on said user device and at least one event which can be transmitted to a server.

At least one module of said plurality of modules may be configured to receive from the event module at least one of said at least one event which can be provided to said server and at least one event dependent on at least one of said at least one event which can be provided to said server, and in dependence thereon to provide an output for transmitting to said server.

The at least one further module may comprise a user state module configured to store user related information which is configured to provide user state related information to the stream processor module.

The user state module may be configured to synchronise data with a server.

The user state module may be configured to be updated by said stream processor.

The at least one further module may comprise a prediction function module, said prediction function module being configured to receive to receive at least one event from the stream processor module via the event module and in response thereto provide an output to control at least one module of said plurality of modules.

The prediction function module may provide one or more of a learning or training function.

The prediction function module may provide one or more of an artificial intelligence function and a machine learning function.

The user device may comprise a user state module configured to store user related information and wherein said prediction function module is configured to receive via said event module user related information from said user state module and at least one application event from at least one of said plurality of modules.

The event module may be configured to receive a stream of application related events from at least module of said plurality of modules and to direct at least a part of the stream of application events to the stream processing module.

The event module may be configured to receive a stream of application related events, determine which of said plurality of said stream of events is required by which other module or modules of said plurality of modules and output said respective events to the respective other module or other modules.

The user device may comprise a display, said display being controlled to display one or more of an image and one or more options in dependence on an output of one or more of said modules.

The user device may comprise a user interface configured to receive user input from a user, said user interface being controlled by said plurality of modules, wherein in response to user input received by said user interface, at least one module is configured to generate one or more events.

The application may be configured to provide a computer implemented game.

A computer implemented method provided by at least one processor and at least one memory in a user device, said at least one processor and at least one memory providing a plurality of modules supporting an application, said method comprising: generating by at least one module one or more events; determining by an event module that one or more of said events is to be provided to a stream processing module; providing the determined one or more events to the stream processing module; performing stream processing by the stream processing module to provide an output; and outputting the output to the event module.

The method may comprise outputting, by the event module, the output from the stream processing module to one or more other modules of said plurality of modules, and controlling said application in response to said output.

The method may comprise outputting, by the event module, the output from the stream processing module to an analytics module.

The method may comprise determining dynamically which of said one or more events is to be processed.

The method may comprise aggregating, by the stream processing module, a plurality of events over a window to provide an aggregated output, and causing said aggregated output to be transmitted to a server.

The method may comprise providing a funnel and causing a result of said funnel to be transmitted to a server.

The method may comprise running one or more scripts on the stream processing module and updating the stream processing module with one or more scripts received from a server.

The method may comprise providing at least one event which can only be used on said user device and at least one event which can be transmitted to a server.

The method may comprise receiving from the event module at least one of said at least one event which can be provided to said server and at least one event dependent on at least one of said at least one event which can be provided to said server, and in dependence thereon to providing an output for transmitting to said server.

The method may comprise storing user related information in a user state module and providing, by the user state module, user state related information to the stream processor module.

The method may comprise synchronising, by the user state module, data with a server.

The method may comprise updating, by said stream processor, the user state module The method may comprise At least one further module may comprise a prediction function module, said prediction function module being configured to receive to receive at least one event from the stream processor module via the event module and in response thereto provide an output to control at least one module of said plurality of modules.

The method may performing in the prediction function module one or more of a learning or training function.

The method may comprise performing in the prediction function module one or more of an artificial intelligence function and a machine learning function.

The method may comprise storing user related information in a user state module and receiving by the prediction function module via the event module user related information from said user state module and at least one application event from at least one of said plurality of modules.

The method may comprise receiving a stream of application related events at the event module from at least module and directing by the event module the stream of application events to the stream processing module.

The method may comprise receiving a stream of application related events at the event module, determining by the event module which of said plurality of said stream of events is required by which other module or modules of said plurality of modules and outputting by the event module said respective events to the respective other module or other modules.

The method may comprise displaying on a display of the user device one or more of an image and one or more options in dependence on an output of one or more of said modules.

The method may comprise receiving user input from a user via a user interface of said device and in response to the user input received by said user interface controlling one or more modules to generate one or more events.

The application may provide a computer implemented game.

According to another aspect, there is provided a non-transitory computer readable medium encoded with instructions for controlling a user device, in which the instructions when executed on a processor which is configured to provide with at least one memory a plurality of modules supporting an application, enable the processor to execute the steps of: generating by at least one module one or more events; determining by an event module that one or more of said events is to be provided to a stream processing module; providing the determined one or more events to the stream processing module; performing stream processing by the stream processing module to provide an output; and outputting the output to the event module.

According to another aspect, there is provided a system comprising a user device and a server, the user device comprising at least one processor and at least one memory, said at least one processor and at least one memory providing a plurality of modules supporting an application, said modules comprising: a stream processing module; an event module; at least one further module, wherein at least one of the at least one further modules is configured to generate one or more events and provide said one or more events to said event module, said event module is configured to provide one of more of said one or more events to said stream processing module, said stream processing module being configured to perform stream processing on the provided one or more events to provide an output to said event module, at least one output of said stream processing module being, in use, transmitted to the server.

According to another aspect, there is provided a user device comprising at least one processor and at least one memory, said at least one processor and at least one memory configured to provide a client, said client providing an application, said client comprising a processing function configured to receive and process one or more application events and a predictive function configured to receive an output from said processing function and in response there to provide a prediction output to control said application.

The processing function may be a stream processing function.

The processing function may be configured to run a plurality of different scripts.

One or more events may be used by a plurality of scripts.

The predictive function may be a learning or training function.

The predictive function may be an artificial intelligence and/or machine learning function.

The prediction output provided by said predictive function may be provided to said application.

The prediction output provided by said predictive function may be provided to the processing function. The processing function may be arranged to provide an output which controls said application.

The application may be controlled by said prediction output either directly or indirectly.

The information which is presented to a user by the application may be controlled or modified. For example, the image which is displayed and/or options which are available to a user in the application may be controlled by the prediction output.

The processing function and the predictive function may be provided by separate modules.

At least one of the processing function, the predictive function and at least one application function communicates with at least one other of said processing function, the predictive function and at least one application function via a messaging function.

The messaging function may be configured to receive information relating to said application events and to provide information about said application events to said predictive function.

The client may comprises one or more client modules providing a respective application function.

The user device may comprise a plurality of different clients.

One or more of the processing function and the predictive function is configured to synchronise with a respective backend function. The respective backend function may be provided by one or more servers.

According to another aspect, there is provided a user device comprising at least one processor and at least one memory, said at least one processor and at least one memory configured to provide a client, said client providing an application, said client comprising a processing function configured to receive and process one or more application events and in response to said one or more events provide an output to control said application.

According to another aspect, there is provided a user device comprising at least one processor and at least one memory, said at least one processor and at least one memory configured to provide a client, said client providing an application, said client comprising a processing function configured to receive and process one or more application events and machine learning function configured to receive an output from said processing function and in response there to provide a prediction output to control said application.

According to another aspect, there is provided a user device comprising at least one processor and at least one memory, said at least one processor and at least one memory configured to provide a client, said client providing an application, said client comprising a processing function configured to receive and process one or more application events and an artificial intelligence function configured to receive an output from said processing function and in response there to provide a prediction output to control said application.

A computer implemented method provided by a client in a user device said client providing an application, said method comprising: receiving at a processing function one or more application events: processing said one or more application events to provide a first processing function output at a predictive function; processing said first processing function at the predictive function to provide a prediction output to control said application.

The client is supported by computer hardware of the user device. The computer hardware comprises at least one processor and at least one processor. The processing function may be a stream processing function.

The method may comprise running a plurality of different scripts on said processing function.

One or more events may be used by a plurality of scripts.

The predictive function may be a learning or training function.

The predictive function may be an artificial intelligence and/or machine learning function.

The processing function and the predictive function may be provided by separate modules.

The method may comprises using a messaging function to communicate between the processing function, the predictive function and at least one application function.

The method may comprise receiving information relating to said application events at the messaging function and providing information about said application events to said predictive function.

The client may comprises one or more client modules providing a respective application function.

The user device may comprise a plurality of different clients.

The method may comprise synchronising one or more of the processing function and the predictive function with a respective backend function. The respective backend function may be provided by one or more servers. In other embodiments, the backend function may be hosted on a cloud server. The at least one processor may be configured to run one or more computer executable instruction (computer program). At least one memory may be provided to store data and the computer program code or instructions.

According to another aspect, there is provided a non-transitory computer readable medium encoded with instructions for controlling a computer apparatus, in which the instructions when executed on a processor enable the processor to execute the steps of: receiving at a processing function one or more application events: processing said one or more application events to provide a first processing function output to a predictive function; and processing said first processing function at the predictive function to provide a prediction output to control said application.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Reference will now be made by way of example only to the accompanying drawings in which.

DETAILED DESCRIPTION OF SOME EMBODIMENTS

Some embodiments will now be described for the handling of data in a user device. Some embodiments will be described in the context of handling game data. However, it should be appreciated that embodiments may be used to handle any type of data and the invention is not limited to the handling of game data. For example, some embodiments may be applied to the social media or web browsing scenarios. Embodiments may be used with any suitable applications.

Figure 3:
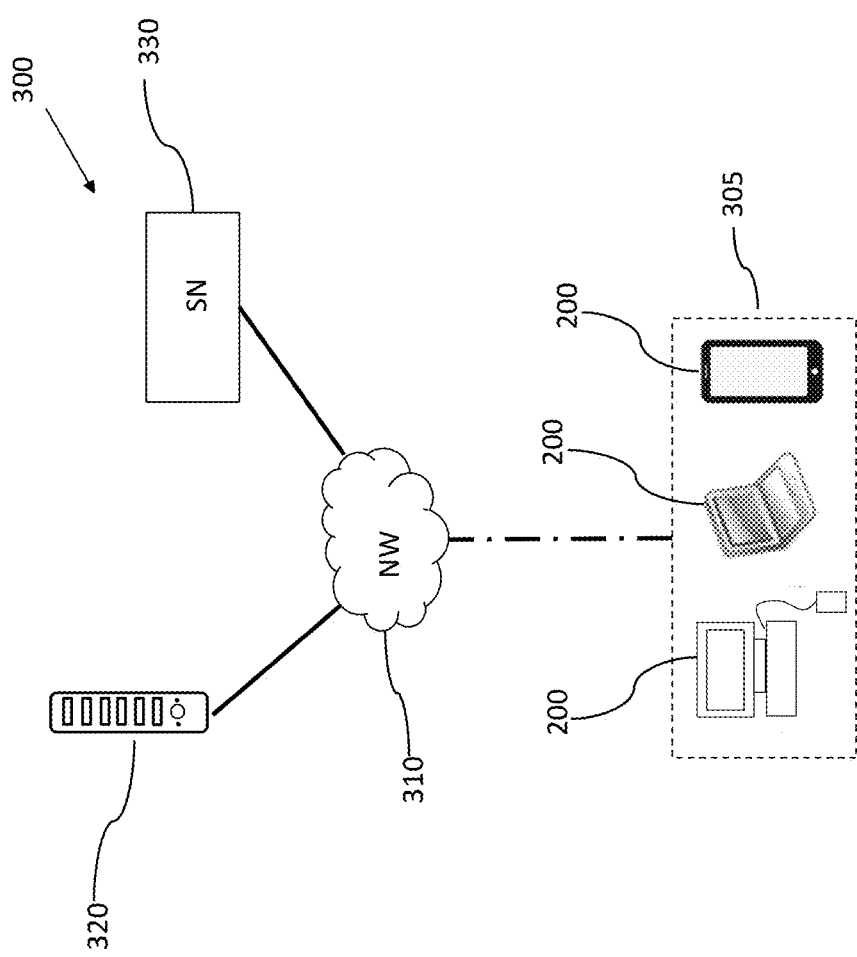
FIG. 3 schematically shows a system in which some embodiments may be provided.

FIG. 3 schematically shows a system 300 of some embodiments. The system 300 comprises a server 320 which may store one or more databases of game players' details, profiles, high scores and so on. In practice, one or more databases may be provided. Where more than one server is provided, the database(s) may be provided in one database or across two or more servers 320. Where more than one server is provided, one or more different servers may be provided in different locations to other servers.

The server 320 may also have a games data function. This may comprise a memory to store the computer game program and a processor to run the games program.

In some embodiments, the database function may be provided by different entities to those providing the game or other supported function.

The server may communicate via for instance the internet 310 to one or more user devices 305. The server may further provide connections to a social network 330 such as Facebook™. It should be appreciated that any other network may alternatively or additionally be used with other networks instead of or in addition to the internet.

It should be appreciated that embodiments may be deployed in different game system architectures. For example, the computer game may be implemented as a computer game that is stored in the memory of the user device 200 and is run on the processor of the user device 200. However, the server 320 may handle some elements of the game in some embodiments. By way of example only, a game applet may be provided to the user device 200 and the locally running applet will generate, for example, the graphics, sounds, and user interaction for the game play on the user device 200. Some data may be fed back to the server 320 to allow interaction with other user devices 305. The data which is fed back may also allow scoring and/or cross platform synchronization.

It should be appreciated in other embodiments, the server may have a different, non-game function, depending on the application supported by the system.

Often, the same user device may support a number of different applications. Different applications may have different servers.

Figure 4:
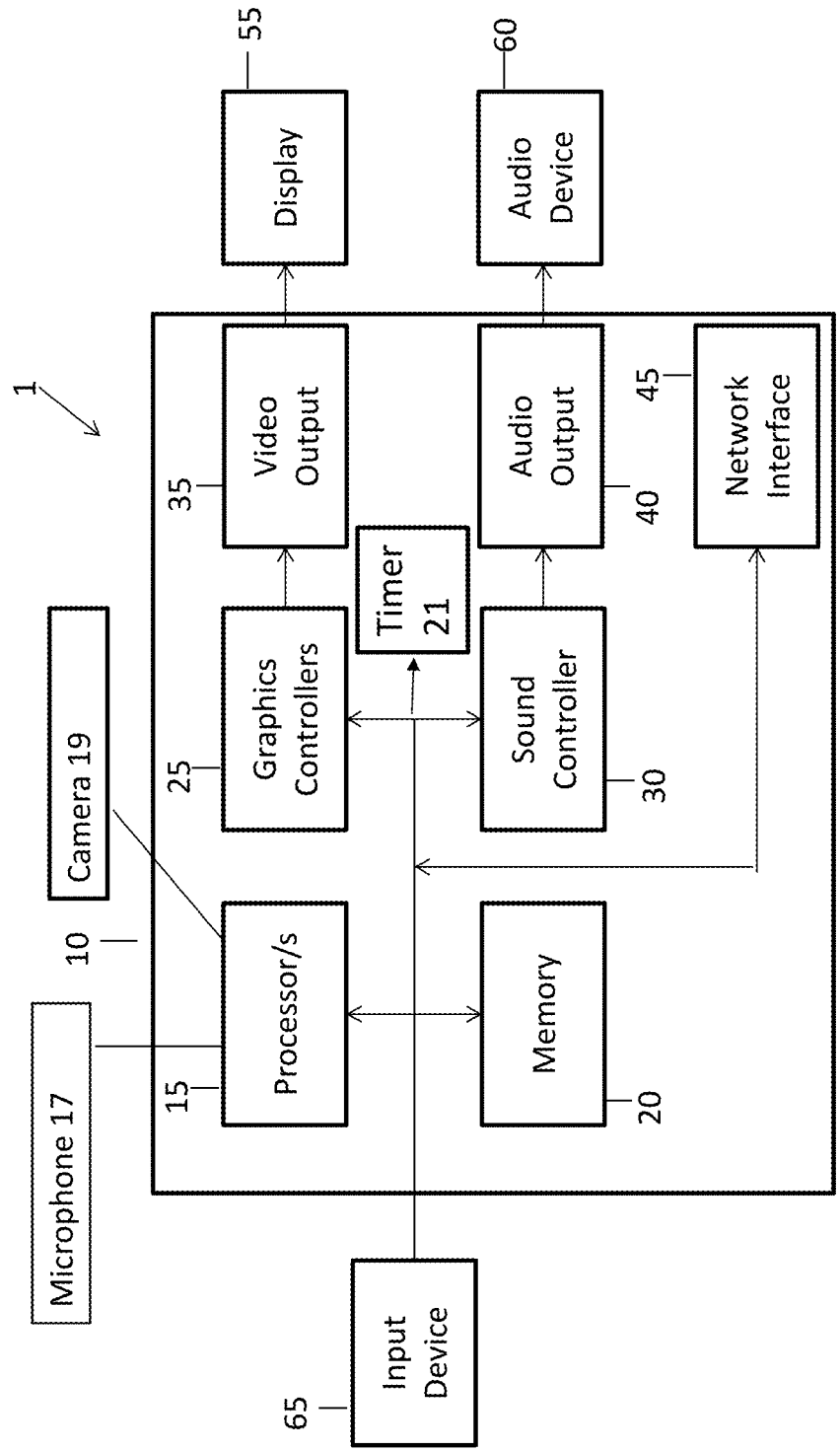
FIG. 4 shows an example user device in which some embodiments may be provided.
Figure 5:
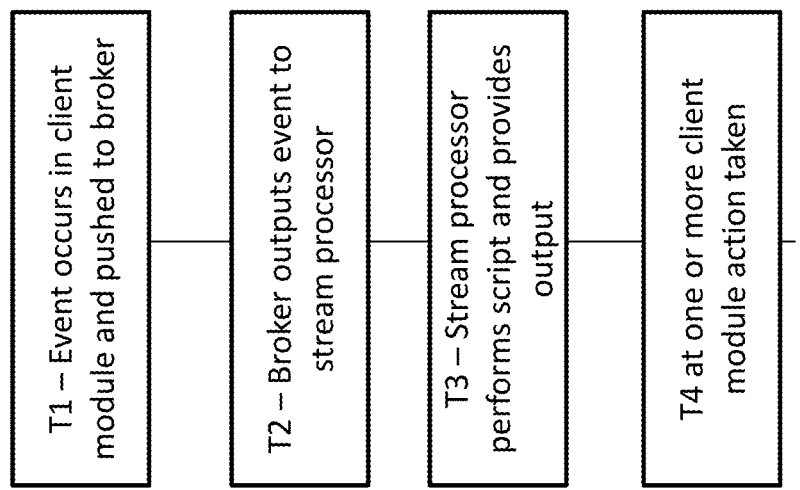
FIG. 5 shows a second method of some embodiments.

A schematic view of a user device 1 according to an embodiment is shown in FIG. 4. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional in some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional in some embodiments.

The control part 10 has an interface 45 allowing the device to be able to communicate with a network such as the Internet or other communication infrastructure.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet, a computer or any other suitable device.

Figure 1:
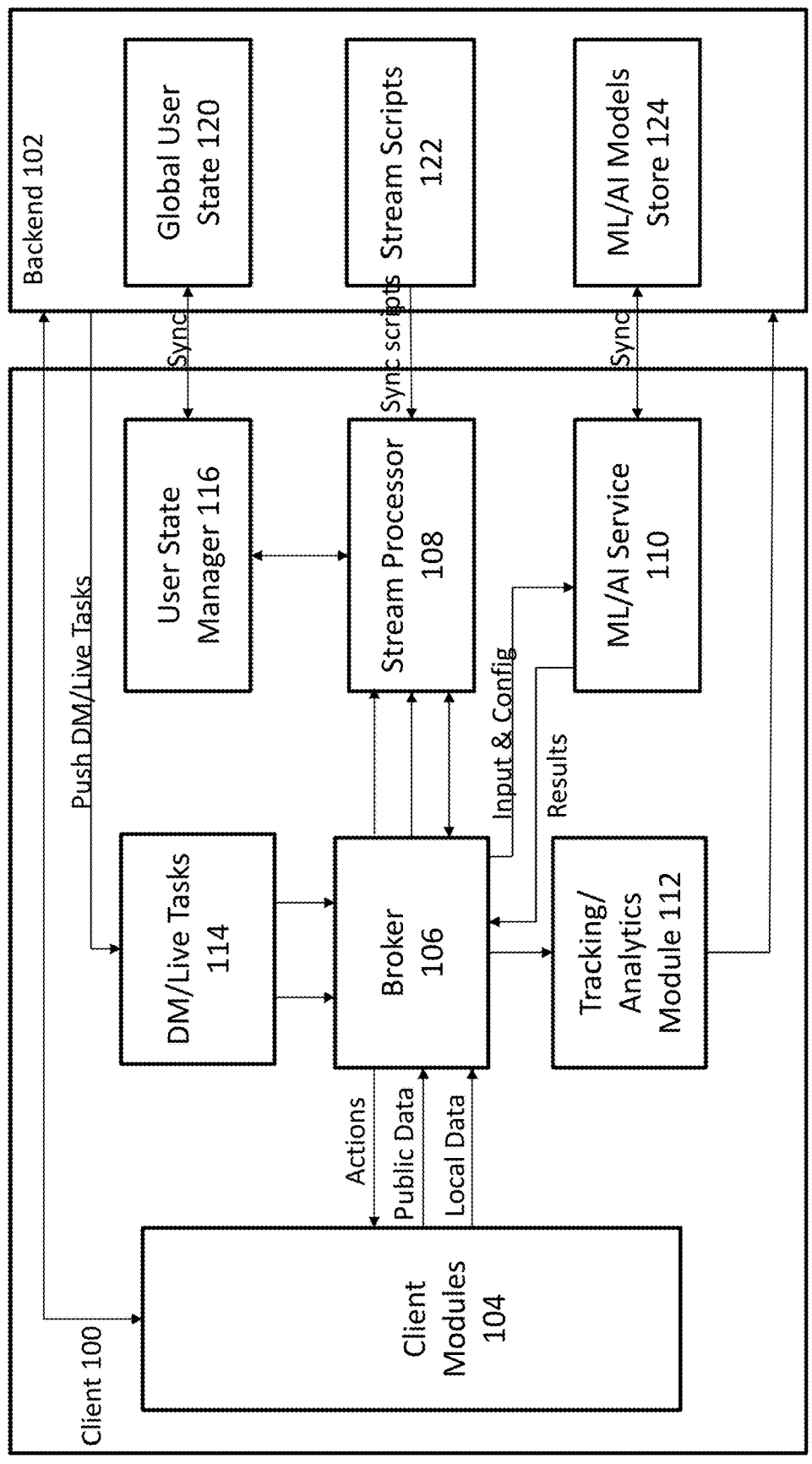
FIG. 1 schematically shows in more detail part of a user device and a server used in some embodiments.
Figure 2:
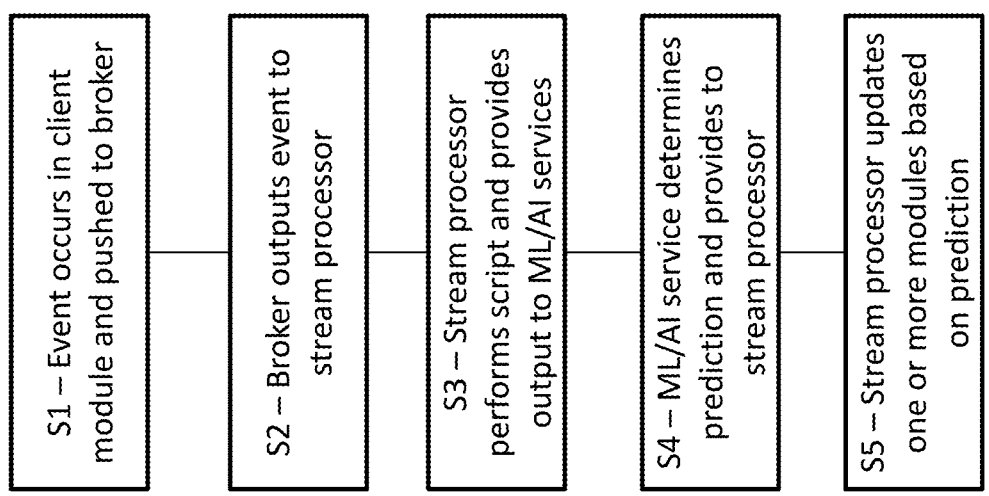
FIG. 2 shows a method of some embodiments.

FIG. 1 schematically shows a client 100 provided on a user device and a backend 102 provided by one or more servers or by a cloud or the like. The client is configured to provide a particular application such as a gaming application or any other suitable application.

The client 100 comprises one or client modules 104, a broker 106, a stream processor 108, a machine learning/artificial intelligence service (ML/AI) 110, a tracking/analysis module 112, a live tasks module 114 and a user state manager 116.

The broker 106 acts as message distribution system. The broker may use "typed" events. These events may be defined in a configuration file. Code may be generated for the client. By way of example only, that code may be C++. The broker may receive data from one or more other parts of the client. That data may be pushed from one or more other parts of the client and/or may be in response to one or more requests from the broker. The broker may issue these requests in response to a request from one or more other parts of the user device and/or may be configured to issue these requests itself. For example, the broker may be configured to periodically request data from one or more other parts of the user device. In other embodiments the events are pushed to the broker.

The broker may be regarded in some embodiments as an event bus that supports typed events and topics. The broker may be provided by an event module. The broker may be configured to manage the events.

In some embodiments, the broker may be configured to receive two types of data.

The first type of data is data which can be sent to the backend and may be referred to a public data. This may be for example information about purchases made in a store, game progress and/or the like.

The second type of data is data which is not sent to the backend. This data may be referred to as local data. This local data may comprise private data. The private data may be data that a user does not want to provide to the back end. This may for example be personal information about the user of the user device. The local data may alternatively or additionally comprise data which is not private data but instead is data which is usually not sent to the server to reduce network loading conditions. For example this local data may comprise ambient light conditions, the time taken between individual moves in a game or any other suitable data.

The one or more client modules may be any suitable client module. The client modules are modules provided in the client for a given application. By way of example only, the client module may be a store module, a game round manager, a gift providing module, a live operation module or the like. The modules may include one or more functions related to the application such as a messaging module, an advertising module and the like. One or more modules may provide sensor or device related information. This may for example be one or more of location information from a positioning module of the user device, lighting conditions around the user device, noise environment around the user device, connectivity information and the like The client modules may be separate modules of an application in some embodiments. In other embodiments, the client module may provide one or more applications.

One or more of the client modules may be configured to have the ability to provide one of a plurality of options. These options may be provided to the user via for example the display.

For example an advertisement module may have a plurality of different options as to one or more of: where an advertisements is placed; when an advertisement is placed; which advertisement is placed; and which type of advertisement is placed.

Another example may be in a store module which may have a plurality of different options as to one or more of: which products are offered to a user; how a plurality of products of offered; when particular products are offered; and layout of the items in the displayed image.

These options may be controlled by the ML/AI service in some embodiments, as will be described later. In some embodiments, an output of the ML/AI service may be provided directly to the application module. In other embodiments, the output of the ML/AI serve may be provide an input variable to the stream processor which in turn provides the output which is used to control the application module.

It should be appreciated that only one client module may be controllable by the ML/AI service (directly or via the stream processor), more than one client module may be controllable by the ML/AI service (directly or via the stream processor), some of the client modules may be controllable by the ML/AI service (directly or via the stream processor), or all client modules may be controllable by the ML/AI service (directly or via the stream processor).

The one or more client modules may be configured to provide event data to the broker. For example, a respective client module may publish or push typed events to the broker on a pre-specified topic.

The broker will provide received information to another module if that module has subscribed to or requested that data.

Each event type may belong to one or more subsets. Each subset may relate to a particular "topic" such as store purchases or the like. In some embodiments an event type may belong to only one subset. In some embodiments, a given event type may belong to more than one subset. In some embodiments, some events do not belong to any subset.

In some embodiments, a module may subscribe to events of a particular subset. In some embodiments a module may subscribe to events of more than one subset. For example, the stream processor may subscribe to one or more subsets or topics.

The events of a subset may be associated with a given client module, in some embodiments. In some embodiments, the events of a subset may be associated with two or more client modules. In some embodiments the events of a subset maybe provided by a plurality of different client modules.

Where a module has subscribed to or receives events of a particular subset, that module may use all, some or none of the received events of that particular subset. One or more filters may be used by a particular model in order to determine which of the events of the subset are required by that module. A particular module may not be interested in all of the events of a given subset.

It should be appreciated that some embodiments may not use subsets or topics to categorize events. The broker may be configured to determine for the event type which other module has subscribed to that event.

In another embodiments, any event from one or more particular client modules may be provided to a given module. Filtering of those events may take place in the module, if required.

In another embodiments, all or most events may be provided to a module and the module uses filtering to obtain the events which are required by that module.

The data which is captured by the client modules may be event data or any other suitable type of data.

The stream processor is configured to receive data from the broker. The broker may receive typed events. The stream process may comprise a streaming engine. The stream processor will process the received data in accordance with one or more scripts running in the stream processor. The stream processor may be implemented by C++ or any other suitable programming language. The stream processor may process events in sequence, process queued events and/or batch process events. The stream process may comprise processing logic that is pushed from the server. That logic may be auto scheduled. In some embodiments, filters may be added based on the script filters. These added filters may be provided from the server. The logic provided by the stream processor may aggregate data. The processing may provide one or more types of output. The processing may use one or more times. One or more of the timers, data to be output and data to be aggregated can be updated based on information from the server side. The stream processor may provide any suitable output. For example, the output may be written back to the broker or provided to the broker. The output may cause dynamic tracking, actions with the client, cause the ML/AI service to make a prediction and/or the like. The stream processor may be configured to provide a resource management or scheduling function on the client.

The stream processor may be configured to receive updated scripts and/or new scripts and/or information to stop using one or more scripts from a respective script function or functions at the backend.

Optionally, the stream processor may be configured to also receive data from the user state manager 116. This data may be local or global user data. The user state manager 116 may synchronize with a state manager function 120 provided in a server.

It should be appreciated that the stream processor is configured such that it is able to use any of the data which it receives and which is required by one or more scripts provided that the sensitive or private data is not transmitted to the backend server. This may be achieved by ensuring that no script causes private or sensitive data to be provided to the server. In other embodiments, one or other or both of the "private" and "public" data is tagged or otherwise identified. The tagging or other suitable identification is used to ensure that no "private" data is provided to the backend.

The user state manager may manages a local user state. The user state manager may support both fact and dimensional states, and optionally states that are synchronized from the game server. The user state manager may comprise a key value store.

The tracking/analysis module receives data from the broker. The tracking/analysis module will have subscribed to receive certain types of data. The tracking/analysis module may send that that data to the backend. The tracking/analysis module may process that data before sending that processed data to the back end. In the case of a game, the tracking/analysis may send game event data to a game server.

The live task module 114 is configured receive from the backend server side defined actions and/or required tracking. The live task module is configured to provide this received data to the broker 106. Depending on the data received, this information may be provided by the broker to one or more of the tracking/analysis module 112 and one or more of the client modules.

The ML/AI service 110 can be accessed/triggered via the broker with a suitable event. The event may be provided to the broker from the stream processor. The ML/AI service takes one or more input event(s) and outputs one or more result events. That result event may be provided to the broker. The broker may then provide that result event to the stream processor. This may trigger the stream processor to cause one or more actions to be performed. These one or more actions may be triggered by a message, request or command which is provided to one or more other modules via the broker 106. For example, a change to one or more of the client modules may result. By way of example only, this may be used to cause the advertising module to pick a certain advertisement or a shop module to provide a particular product.

The ML/AI service 110 may support training and/or inference/prediction. The ML/AI service may be implemented using a suitable ML/AI library.

The ML/AI service may provide a machine learning function or an artificial intelligence function or both.

The ML/AI service may be updated and/or provide information to a corresponding function 124 at the backend.

The ML/AI service may be configured to learn from one or more actions taken by the user in response to a prediction. This feedback information may be provided to the ML/AI service from the stream processor. The stream processor may for example have a script which runs to determine what the user does in response to a prediction and provides an output the ML/AI service. Alternatively or additionally this may be used to provide an output which is transmitted to the ML/AI service at the backend. The ML/AI may use this output to learn.

In some embodiments, the stream processor may send, via the broker, an event to the ML/AI service with one or more of the following information:
features: matrix of numbers;
model: which model is to be executed by the ML/AI service; and
id: unique id to identify the request.

The ML/AI service may receive the event and execute the model identified using the feature information. The ML/AI service will then provide a response in the form of an event which is provided to the stream processor via the broker. The event may have one or more of the following information:
result: number or vector of numbers; and
id: unique id from the initial request.

Embodiments may be used to provide one or more functions. For example, some embodiments may be used for dynamic tracking. One or more client modules may add tracking/data calls that push an event to the broker. The broker provides the events to the stream processor. The stream processor may consumes those events and provide functionality that may be dynamically controlled via one or more scripts.

For example a filtering function may be provided. The stream processor may determine dynamically which events to process.

An aggregating function may be provided. For example the streaming processor may be configured to aggregate events over a given window and only send an aggregated output to server.

The stream processor may provide a function to compute funnels. For example, more complex funnels are provided directly on the client and the client only sends back the result to server. A funnel may define a series of events which have to be provided in a given order for the funnel to be completed or for the funnel to provide the desired output. There may be one or more events which if not received in that given order will cause the funnel not to be considered completed. Alternatively or additionally there may be one or more events which if received in that defined order will cause the funnel not to be considered completed.

Consider a simple example. The funnel requires a first type of game event to be followed by a second type of game event followed by a third type of game event. If these three events are received in this order the funnel may provide a given type of output. If for example a second first type of game event is received before the second type of game event, the funnel may be restarted. It should be appreciated that an intervening event may cause the funnel to be considered not completed and thus ended or restarted. The funnel may provide an output different than the desired output if the funnel is not considered completed. Such output different from the desired output may indicate why the funnel was not considered completed or comprise information relating to why the funnel was not considered completed.

The stream processor may provide one or more funnels. The output of one funnel may input to one or more other funnels.

The stream processor may push "public" events back to the broker that are then consumed and tracked via the analytics/tracking module. These events may be provided to the backend, in some embodiments.

This may be useful for dynamically turning on/off tracking, e.g. for live ops or for live debugging of the client. This may be in response to information or the like which is received from the backend in response to the data which has been provided to the backend.

Some embodiments may provide real time prediction on the user device. Some embodiments may provide the ability to run real time predictions/inference on the client to personalize the user experience.

In one embodiment, a script is pushed to the stream processor by the server. The script may builds up a user state relevant for a given use case.

On a given trigger, e.g. on a purchase, the user data is sent by the stream processor via the broker to the ML/AI service. The result from the ML/AI service is processed again by the script in the stream processor. Depending on the result, action may be taken by one or more client modules. This may be in response to an output provided by the stream processor which is provided to the one or more client modules via the broker module. For example one action may be to change a store configuration after a purchase. The store configuration may be altered to change the image which is displayed to the user, change one or more items which are displayed to a user, change the position of one or more items and/or the like.

A method of some embodiments will now be described.

In step S1, an event occurs in a client module. In practice a series of events will occur in each of these modules. These events are pushed to the broker. In some embodiments any event will be pushed to the broker. In other embodiments, a subset of events may be provided to the broker. In this latter case, this may be part of a configuration process.

In step S2, the broker will determine for each event if any one or more other modules has subscribed to that event. The event will then be output to any module which has subscribed to that particular event. In this example method, it is assumed that the stream processor has subscribed to a plurality of these events.

In step S3, the stream processor will perform at least one script with respect to one or more events. Optionally the stream processor may use data from the user state manager. In this example, it is determined by one or more scripts that a prediction is required from the ML/AI service 110. The stream processor outputs to the broker data which is to be provided to the ML/AI service. The data may comprise one or more of an instruction, data about one or more of the events and one or results from the running of the scripts.

In step S4, the ML/AI service provides a prediction based on the information provided by the stream processor. Information associated with the prediction is provided to the stream processor via the broker.

In step S5, based on the prediction, the stream processor is configured to update one or more of the client modules. This may be achieved by issuing one or more instructions via the broker.

Another example will now be described. One or more game modules collect data and send it to the broker. The broker provides the data to the stream processor. The stream processor creates a user state from that data. A game module sends an application start event via the broker to the stream processor. The stream processor receives the application start event and decides whether to trigger the ML/AI service to make a prediction. If so, this is done by sending a request to the ML/AI service. The ML/AI service provides a prediction to the stream processor via the broker. The stream processor thus receives the prediction result and potentially triggers an action. The result of prediction may be sent back to the server for persistence and further processing. Alternatively or additionally the user preference may be updated in real time in the client to optimize user preferences.

Another example will now be described. A sensor client module collects ambient light data and provide light data to the broker. That data is provided to the stream processor. The stream processor may create a user state from that light data. An advertisement client data module send an advertisement event via the broker to the stream processor. In response to that event, the stream processor may trigger the ML/AI to make a prediction as to which advertisement is most likely to result in a "successful" outcome. The stream process receives the prediction result which is used to trigger an action in the advertisement module. That action may be to select an advertisement most suited to the ambient light conditions. As will be discussed later, this ML/AI service may be omitted or not used in some embodiments, with the stream processor providing an output to trigger an action in the advertisement module. Some embodiments may using further data stored on the client device and/or modules of the client device to provide current condition data, and process the data in the stream processor of the client device.

Another embodiment will now be described. In some embodiments, a module which provides advertising content or other content may be provided. The advertisement which is provided may be controlled by the stream processor. A sensor client module collects device orientation data to the broker. That data is provided to the stream processor. The stream processor may create a user state from that data. An advertisement client data module send an advertisement event via the broker to the stream processor. In response to that event, the stream processor may trigger the ML/AI to make a prediction as to which advertisement is most likely to result in a "successful" outcome. This ML/AI module will use the orientation data to generate a prediction result. The stream process receives the prediction result which is used to trigger an action in the advertisement module. That action may be to select an advertisement most suited to the ambient light conditions.

The ML/AI module may use a plurality of different types of information to make a prediction in some embodiments. For example the ML/AI module may use one or more of time information, device orientation, light data, game progress information and/or any other suitable information.

As will be discussed later, this ML/AI service may be omitted or not used in some embodiments, with the stream processor providing an output to trigger an action in the advertisement module.

Some embodiments may provide one or more of the following advantages. By having a stream processor on the client, that stream processor may have access to more data than if backend processing is relied on. Some embodiments may allow local (client-side only) tracking that is used for local processing only. The stream processor may have access more granular data. For example the local stream processor may have access to every move during a game round, sensor data measures by the user device, granular interaction with the game and/or the like. In some embodiments, aggregates of local tracking may be provided to server. By having a stream processor and optionally the ML/AI support on the user device a low latency may be achieved. Since the need for a server round trip is avoided, predictions may be executed in almost real time.

Some embodiments may provide ML/AI support on the client. This may allow the running and/or training of the models on the client.

Synchronisation of the model with the game server may be achieved.

Some embodiments, may provide offline support. By providing the functionality on the client, this functionality is able to continue to work even if the client device is offline.

In some embodiments, the scripts for the stream processor may be configured on the server side and pushed/synchronised with those on the client side. The scripts will then be executed on the client side.

The modular arrangement of the client code with the broker being used for communication make it simpler to provide the relatively complex stream processing functionality in the client.

Some user devices may support more than one client. Two or more of those clients may each have their own modules, such as shown in FIG. 1. In other words, each client may have its own instance of the modules. Each client may be associated with its own application. The application may be any suitable application such as a gaming application, a social media application, a mapping application, a dating application, an entertainment application, a health and fitness application or any suitable application.

In other embodiments, one or more of the clients may share one or more modules. By way of example only, two or more clients may share an ML/AI service and/or a stream processor. However, this is by way of example only and any one or more modules may be shared between two or more clients, in some embodiments.

In some embodiments, a different arrangement of functions between different modules. For example, the broker function and the stream processing function may be provided by a common module.

One or more of the tracking/analysis module 112, the live tasks module 114 and the user state manager 116 may be omitted. One or more other modules may additionally or alternatively be provided.

It should be appreciated that the client modules provided may be dependent on function provided by the application.

In some embodiment, the client may be a virtual client.

In some embodiments, for example where the client is providing a gaming application, at least part or all the client may be provided by a game engine.

By way of example only, a use case will be considered to explain operation of the stream processor in some embodiments. In this example use case, the amount of particular boosters associated with a particular level is to be monitored. In order to be able to monitor this, information about a current level and information about the boosters used while playing that level is required. The events which are provided, in this example, do not have the booster information and the game level in the same event. Rather, the game level is provided in one type of event. Information about boosters are provided in different events.

The scripts which are being run for the respective queries are deployed in the stream processor.

When a script is deployed, it is determined what state is required for the query. For example, in the case of the example query, the state will be the current game level. This state is stored in the data store. This state can be used by any query or script. For example another query may be the number of attempts to complete a particular level. The level state can be used in that latter query as well as the query with the amount of boosters use.

It should be appreciated that when a particular value for a state changes, the value in the state data store is updated. In some embodiments the stream processor is configured to run a plurality of different scripts. Events may be read once but may be used by more than one script.

The streaming processor may be implemented by computer executable code running on one or more processors in the user device. The stream processor may use events which may alternatively be referred to as data records or data.

An output may be provided to the server and/or to another module. The output may be provided as an input to a further computational process supported by one or more processors. For example, an output may be provided to the ML/AI service. In some embodiments, the output may be via the broker.

To explain some example embodiments, the example event data is game data. However it should be appreciated that the data may be any other suitable data, depending on the functionality supported. In some embodiments, event data may be collected for a computer implemented game being played on a user device. Event data may comprise data relating to something (event) which has occurred such as a level has been completed, the player has started playing the game, a particular booster has been used or the like. The event data may also comprise associated information such a location of the user, the game being played and/or the like. The event data may comprise contextual information about the game at the point at which the event occurred such as how much life a player has left when the event occurs or the like. The event data which is collected may comprise any one or more of the above data and/or any other suitable data.

At least some of the events may be stored in a data store. When events are generated, at least some of the events may be at least temporarily stored. The event data may be pushed to the broker and from there sent to any other module which requires that event. In other embodiments, location information is sent to the broker indicating the location in the data store of that memory. For example, the location information may take the form of a pointer or the like. Information about the location of that data may be provided to any other module which requires that data. Some embodiments may use both of these techniques.

Synchronization with the backend may occur periodically and/or be in response to one or more events occurring in the application and/or may be controlled by the user device. The modules in the client which require synchronization may be synchronized independently and/or may be synchronized in a same operation.

In the above embodiments reference has been made to a streaming processor. In some embodiments, a stream of events may be provided to that processor. However, in other embodiments, the processor may not process a stream of events and may not be considered as a "stream" processor. The processor or stream processor may be provided by one or more physical processors.

In some embodiments, the ML/AI service may be omitted.

Another method of some embodiments will now be described.

In step T1, an event occurs in a client module. In practice a series of events will occur in each of these modules. These events are pushed to the broker. In some embodiments any event will be pushed to the broker. In other embodiments, a subset of events may be provided to the broker. In this latter case, this may be part of a configuration process.

In step T2, the broker will determine for each event if any one or more other modules has subscribed to that event. The event will then be output to any module which has subscribed to that particular event. In this example method, it is assumed that the stream processor has subscribed to a plurality of these events.

In step T3, the stream processor will perform at least one script with respect to one or more events. Optionally the stream processor may use data from the user state manager. In this example, it is determined by one or more scripts that an action is required to be performed by one or more client modules and provides an output.

In step T4, based on the output, one or more of the client modules will perform the required action in response to the provided output. This may be achieved by issuing one or more instructions via the broker.

This action may have an impact the image displayed by a particular client module, provide a control input to the advertising client module to control an aspect of the advertisements, control what objects are offered or displayed in a shop client module or any suitable aspect of a client module.

In some embodiments, the output provided by the processor may be in the form of an event.

In some embodiments, where there is no AI/ML service, the stream processor function may be providing some control based on one or more events as to what a client module to present to a user. The stream processor may be able to learn from a user's past behavior.

The options previously discussed in relation to advertisement control etc. may also be achieved in some embodiments. In some embodiments state information may be used. For example, the state may be light level and an event is received that an advertisement is to be provided. The stream processor can provide an output, for example in the form of an event. The output provided by the stream processor can be provided to the application module to cause an advertisement suited to the light conditions to be provided.

Of course, there are many other possible examples. The code may be run on one or more processors in conjunction with one or more memories. The code may be run on the same at least one apparatus which provides the processing and/or or on at least one different apparatus. The apparatus may be at least one server or the like.

Some embodiments may allow an application which is provided on the user device to be tailored to the particular use of the user device rather than to a larger population or segment of other users. This may provide an increase in user engagement. As mentioned previously, the application may provide a user implemented game or be any other suitable application.

Some embodiments are dynamic in nature. Accordingly iterations to be applied to the application can be controlled via the server side and do not require new client releases. This may significantly speed up the providing of new features and updates to an application.

Some embodiments enable one or more applications and/or one or more scripts to make use of AI/ML capabilities directly on the user device.

Some embodiments allow local tracking on the user device which is used only in local processing. In other words, one or more events may be used on the client. Those events may not be provided to the server device. This may be because the event is considered to be private and/or because the event is not passed to the server due to the relative unimportance of the event. In some embodiments, not every event generated in a game is passed back to a server. This may be in order to minimize the data which is sent to the server. This may for example be an issue where the user device is a mobile device and there are monetary costs and/or performance issues associated with network data usage.

In some embodiments, the data which is available on the user device and not the server may be any suitable data. By way of example only, such data may comprise one or more of every move during a game round, device sensor data, granular interaction with the game such as individual swipes and/or the like.

In some embodiments, aggregates of local tracking may be prepared and sent to the server. The aggregated data may require less data than if the events were sent individually.

In some embodiments, as the requirement for server round trips may be avoid for one or more predictions, the predications can be provided almost in real time on the user device.

Some embodiments may allow TensorFlow or the like models to be run on the client of the user device. TensorFlow models are used by some machine learning applications.

Some embodiments may allow synchronizing of the TensorFlow models or the like on the client with those on the server.

In some embodiments, as the modules discussed previously are provided on the user device, the client is able to function in the same way even when the user device is offline.

In some embodiments, one or more scripts may be configured on the server side and then pushed or synchronized on the client where the one or more scripts may be executed.

The modular nature of some embodiments may make it easier to implement. In some embodiments, at least some of the modules are configured to interact with one or more other modules via the broker.

In some embodiments, the broker acts as message distribution system using events. The events may be "typed" events. The events may be defined in a configuration file and then computer program code is generated for the client. The computer program code may be in C++.

In some embodiments, one or more client modules publish typed events to the broker.

In some embodiments, the tracking analytics module may consume tracking topics and sends events to the game server.

In some embodiments, the live tasks module may publishes server side defined actions (and tracking) directly to the broker.

In some embodiments, the stream processor may consume all relevant topics and process them according to the scripts.

In some embodiments, the user state manager may provide a global state management system.

In some embodiments, the ML/AI service module can be accessed/triggered via the broker with a typed event. The ML/AI service module may take an input event and output a result event. The result event is provided to the broker which is distribute that event to any module which has subscribed to that event.

Some embodiments may allow dynamic tracking.

One or more client modules may add verbose tracking/data calls that push an event to the broker. The stream processor may consumes those events and provide functionality that may be dynamically controlled via scripts.

For example, a filter functionality may dynamically decide which events to process.

For example, a window functionality may aggregate events over a given window and only send the aggregated output back to server. This may reduce the amount of data which needs to be sent back to the server.

For example, a funnel functionality may build more complex funnels directly on the client and only send back a result to server.

The stream processor may push "public" events back to the broker that are consumed and tracked via the analytics/tracking module.

This dynamic tracking may be used to dynamically turn on/off tracking. For example, this tracking may be used for only certain types of game mode such as a live ops game mode.

This dynamic tracking may be used for live debugging of the client.

Some embodiments may allow real time prediction on device.

For example, there may be an ability to run real time predictions/inference on the client to personalize the user experience.

Another example workflow will now be described:

Push a script that builds up a user state relevant for a given use case.

On a given trigger, e.g. on a purchase, take the user data and send it via broker to the ML/AI service.

A result from the ML/AI service is processed again by the script and depending on the result, action is taken directly on the client.

For example this may be used change a store configuration after each purchase. For example, the store may change the items order which is displayed or indicate that a particular item has been purchased or change the available items.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, and/or CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A user device comprising at least one processor and at least one memory, the at least one processor and at least one memory implementing, by the at least one processor executing instructions stored in the at least one memory, a plurality of modules supporting an application configured to provide a computer implemented game, the plurality of modules being provided in the user device and comprising:
   a stream processing module;
   a message distribution module for distributing events between modules;
   at least one game module;
   at least one game option module; and
   a prediction module
      wherein:
   at least one of the at least one game module is configured to generate one or more game events and provide the one or more game events to the message distribution module;
   the message distribution module is configured to provide one or more of the one or more game events to the stream processing module;
   the stream processing module is configured to determine based on the one or more game events received from the message distribution module that the prediction module is to be triggered to make a prediction, said stream processing module sending a request for the prediction to the message distribution module;
   the message distribution module is configured to send the request for the prediction to the prediction module;
   the prediction module is configured in response to the request for the prediction to provide a prediction based on one or more of the game events and send the prediction to the message distribution module, to control one or more of the game option modules;
   the message distribution module is configured to send the prediction to the stream processing modules; and
   the stream processing module is configured to provide an output, based on the prediction to trigger an action in the one or more of the at least one game option module, said action comprising controlling one or more options provided to a user in the computer implemented game.

2. The user device as claimed in claim 1, wherein the stream processing module is configured to perform stream processing on the received one or more game events to provide processed game events the prediction module being configured to process the processed game events to provide the prediction.

3. The user device as claimed in claim 1, wherein the message distribution module is configured to provide an output from the stream processing module to the at least one of the at least one game module to thereby control the computer implemented game.

4. The user device as claimed in claim 1, wherein the modules further comprise an analytics module and the message distribution module is configured to provide one or more outputs from the stream processing module to the analytics module.

5. The user device as claimed in claim 1, wherein the stream processing module is configured to determine dynamically which of the one or more game events is to be processed.

6. The user device as claimed in claim 1, wherein the stream processing module is configured to aggregate a plurality of game events over a window to provide an aggregated output, the stream processing module being configured to cause the aggregated output to be transmitted to a server.

7. The user device as claimed in claim 1, wherein the stream processing module is configured to determine that a series of game events have occurred in a given order and in response thereto provide an output.

8. The user device as claimed in claim 1, wherein the stream processing module is configured to run one or more scripts and to be updated by one or more scripts received from a server.

9. The user device as claimed in claim 1, wherein at least one module of the plurality of modules is configured to provide at least one event which can only be used on the user device and at least one event which can be transmitted to a server.

10. The user device as claimed in claim 9, wherein at least one of the plurality of modules is configured to receive from the message distribution module the at least one event which can be provided to the server and at least one event dependent on the at least one event which can be provided to the server, and in dependence thereon to provide an output for transmitting to the server.

11. The user device as claimed in claim 1, wherein the plurality of modules further comprises a user state module, the user state module configured to store user related information and provide user state related information to the stream processing module.

12. The user device as claimed in claim 11, wherein the user state module is configured to synchronise data with a server.

13. The user device as claimed in claim 11, wherein the user state module is configured to be updated by the stream processing module.

14. The user device as claimed in claim 1, wherein the prediction module provides one or more of a learning or training function.

15. The user device as claimed in claim 1, wherein the prediction module provides one or more of an artificial intelligence function and a machine learning function.

16. The user device as claimed in claim 1, wherein the prediction module is configured to receive via the message distribution module user related information and at least one game event from at least one of the plurality of modules.

17. The user device as claimed in claim 1, wherein the message distribution module is configured to receive a stream of game related events, determine which of the game related events is required by which one or more modules of the plurality of modules and output the respective game related events to one or more modules of the plurality of modules.

18. The user device as claimed in claim 1, comprising a user interface configured to receive user input from a user, the user interface being controlled by one or more of the plurality of modules, wherein in response to user input received by the user interface, at least one module of the plurality of modules is configured to generate one or more events.

19. A computer implemented method provided by at least one processor and at least one memory in a user device, the at least one processor and at least one memory implementing, by the at least one processor executing instructions stored in the at least one memory a plurality of modules supporting an application configured to provide a computer implemented game, the plurality of modules being provided in the user device, and comprising a stream processing module, a message distribution module for distributing events between modules, at least one game module, at least one game option module, and a prediction module, the computer implemented method comprising:
  generating, by at least one of the at least one game module, one or more game events and providing the one or more game events to the message distribution module;
  determining, by the message distribution module, that one or more of the one or more game events is to be provided to the stream processing module;
  providing, by the message distribution module, the determined one or more of the one or more game events to the stream processing module;
  determining, by the stream processing module, based on the one or more game events received from the message distribution module that the prediction module is to be triggered to make a prediction;
  sending, by the stream processing module, a request for the prediction to the message distribution module;
  sending, by the message distribution module, the request for the prediction to the prediction module;
  providing, by the prediction module, in response to the request for the prediction a prediction based on one or more of the one or more game events;
  outputting, by the prediction module, the prediction to the message distribution module, to control one or more of the at least one game option module;
  sending, by the message distribution module, the prediction to the stream processing module; and
  providing, by the stream processing module, an output, based on the prediction to trigger an action in the one or more of the at least one game option module, said action comprising controlling one or more options provided to a user in the computer implemented game.

20. A non-transitory computer readable medium encoded with instructions for controlling a user device, in which the instructions when executed on a processor which is configured to implement, with at least one memory, a plurality of modules supporting an application configured to provide a computer implemented game, the plurality of modules being provided in the user device, and comprising a stream processing module, a message distribution module for distributing events between modules, at least one game module, at least one game option module, and a prediction module, the instructions enabling the processor to execute the steps of:

generating, by at least one of the at least one game module, one or more game events and providing the one or more game events to the message distribution module;

determining, by the message distribution module, that one or more of the one or more game events is to be provided to the stream processing module;

providing, by the message distribution module, the determined one or more of the one or more game events to the stream processing module;

determining, by the stream processing module, based on the one or more game events received from the message distribution module that the prediction module is to be triggered to make a prediction;

sending, by the stream processing module, a request for the prediction to the message distribution module;

sending, by the message distribution module, the request for the prediction to the prediction module;

providing, by the prediction module, in response to the request for the prediction a prediction based on one or more of the one or more game events;

outputting, by the prediction module, the prediction to the message distribution module, to control one or more of the at least one game option module;

sending, by the message distribution module, the prediction to the stream processing module; and providing, by the stream processing module, an output, based on the prediction to trigger an action in the one or more of the at least one game option module, said action comprising controlling one or more options provided to a user in the computer implemented game.

* * * * *